United States Patent
Feng et al.

(10) Patent No.: US 11,645,474 B2
(45) Date of Patent: May 9, 2023

(54) COMPUTER-IMPLEMENTED METHOD FOR TEXT CONVERSION, COMPUTER DEVICE, AND NON-TRANSITORY COMPUTER READABLE STORAGE MEDIUM

(71) Applicant: UBTECH ROBOTICS CORP LTD, Shenzhen (CN)

(72) Inventors: Zhongfa Feng, Shenzhen (CN); Dongyan Huang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 398 days.

(21) Appl. No.: 17/133,673

(22) Filed: Dec. 24, 2020

(65) Prior Publication Data
US 2021/0200962 A1 Jul. 1, 2021

Related U.S. Application Data

(63) Continuation of application No. PCT/CN2019/130366, filed on Dec. 31, 2019.

(51) Int. Cl.
*G06F 40/40* (2020.01)
*G10L 13/08* (2013.01)

(52) U.S. Cl.
CPC .............. *G06F 40/40* (2020.01); *G10L 13/08* (2013.01)

(58) Field of Classification Search
CPC ...... G06F 40/40; G06F 40/279; G06F 40/284; G06F 18/24; G06F 18/214; G10L 13/08; G10L 13/00; G06N 20/00; G06V 30/10
USPC .............................................. 704/9
See application file for complete search history.

(56) References Cited

FOREIGN PATENT DOCUMENTS

CN 101661462 A 3/2010

*Primary Examiner* — Thierry L Pham

(57) ABSTRACT

A computer-implemented method for text conversion, a computer device, and a non-transitory computer readable storage medium are provided. The method includes: obtaining a text to be converted; performing a non-standard word recognition on the text to be converted, to determine whether the text to be converted includes a non-standard word; recognizing the non-standard word in the text to be converted by using an eXtreme Gradient Boosting model in response to the text to be converted including the non-standard word; and obtaining a target converted text corresponding to the text to be converted, according to a recognition result outputted by the eXtreme Gradient Boosting model. The method has a faster recognition speed and a higher recognition accuracy compared with the deep learning model.

20 Claims, 6 Drawing Sheets

COMPUTER-IMPLEMENTED METHOD FOR TEXT CONVERSION, COMPUTER DEVICE, AND NON-TRANSITORY COMPUTER READABLE STORAGE MEDIUM

CROSS REFERENCE TO RELATED APPLICATIONS

The present application is a continuation-application of International Application PCT/CN2019/130366, with an international filing date of Dec. 31, 2019, the contents of all of which are hereby incorporated by reference.

BACKGROUND

1. Technical Field

The present disclosure generally relates to text conversion technology, and particularly to a computer-implemented method for text conversion, a computer device, and a non-transitory computer readable storage medium.

2. Description of Related Art

TTS (Text To Speech) technology is a technology that converts text information generated by the computer itself or externally input into an intelligible and fluent spoken speech. The text normalization refers to a conversion of non-standard words in the text into words in spoken form, for example, a conversion of a text "my phone number is 12345" into "my phone number is one two three four five". In this example, "1", "2", "3", "4", "5" are non-standard words, and "one", "two", "three", "four", "five" are colloquial expressions (or pronunciations) of "1", "2", "3", "4", "5". A great influence on the practicability of a TTS system is whether the TTS system can effectively recognize the non-standard words in the text information and correctly convert them into corresponding words in spoken form. Therefore, the text normalization is an indispensable part of the speech synthesis technology.

The existing text normalization methods are mostly the methods based on linguistic rules and deep learning. The methods based on the linguistic are time-consuming and inefficient, because they need to enumerate all possible situations as much as possible. The methods based on the deep learning need to input the non-standard text into a deep learning model, to obtain the text in spoken form outputted by the deep learning model. However, the recognition speed of the deep learning model is slow, and if the training corpus is insufficient, the recognition accuracy of the deep learning model will be relatively low.

BRIEF DESCRIPTION OF DRAWINGS

In order to more clearly illustrate the technical solutions in the embodiments of the present disclosure, the drawings used in the embodiments or the prior art description will be briefly introduced below, obviously, the drawings in the following description are only some embodiments of the present disclosure, and those skilled in the art without any creative labor can obtain other drawings according to the drawings.

DETAILED DESCRIPTION

In order to make the object, the features and the advantages of the present disclosure more obvious and understandable, in conjunction with the drawings in the embodiments of the present disclosure, the technical solutions in the embodiments of the present disclosure will be clearly and completely described below, obviously, the embodiments described below are only some of the embodiments of the present disclosure, but not all of the embodiments. Based on the embodiments of the present disclosure, all other embodiments obtained by those skilled in the art without creative labor are within the scope of the present disclosure.

Figure 1:
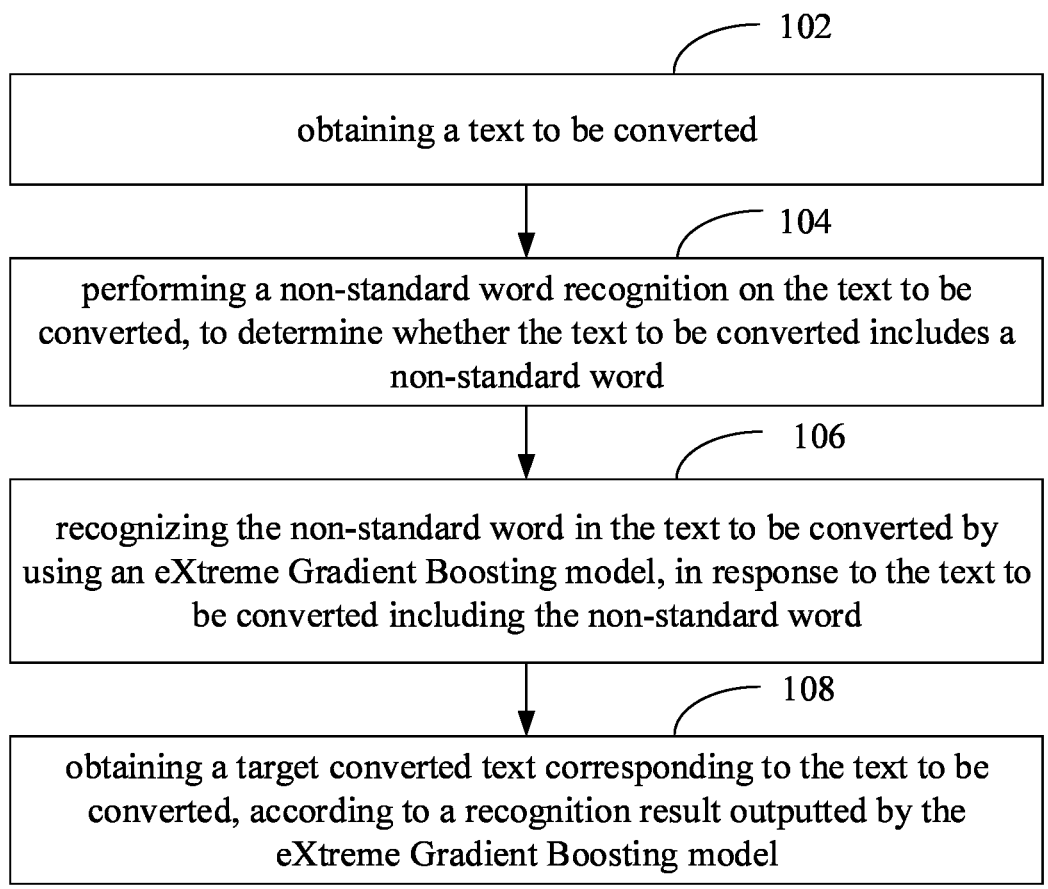
FIG. 1 is a schematic flow chart of one embodiment of a computer-implemented method for text conversion in accordance with the present disclosure.

As shown in FIG. 1, in one embodiment, a computer-implemented method for text conversion is provided. The executor of the computer-implemented method for text conversion in the embodiment is a device that can perform the method for text conversion in the embodiment. The device may, but is not limited to, include a terminal and a server. The terminal includes a mobile terminal, and a desktop terminal. The mobile terminal may, but is not limited to, include a mobile phone, a tablet PC, and a note personal computer. The desktop terminal may, but is not limited to, include a desktop computer, and a board computer. The server includes a high performance computer, and a high performance computer cluster. The computer-implemented method for text conversion, specifically includes the following steps.

Step 102, obtaining a text to be converted.

The text to be converted is a text that needs to be converted. In the embodiment of the present disclosure, firstly, the text to be converted is obtained, then whether at least one non-standard word is included in the text to be converted is determined. If the at least one non-standard word is included in the text to be converted, the text to be converted is converted, and a target converted text is obtained after conversion.

The text to be converted can be some preset texts, for example, some texts are preset in the system, target converted texts of the texts are obtained for subsequent voice playing. Or, a speech to be converted can be obtained, then the speech recognition is performed on the speech to be converted, and the text to be converted is obtained.

Step 104, performing a non-standard word recognition on the text to be converted, to determine whether the text to be converted includes a non-standard word.

The non-standard word includes at least one of a numeral, a character and a numeral group. For example, the text to be converted is "I live in room 605 unit 10 garden apartment", where, "605", "10" are the non-standard words (the numeral groups), "I", "live", "in", "room", "unit", "garden", "apartment" are standard words that do not need to be converted. As another example, the text to be converted is "today is 2019/10/19", where, "today" and "is" are the standard words, "2019", "/", "10", "/", "19" and "/" are the non-standard words (the numeral groups and the characters). As another example, the text to be converted is "the score is 3:2", where, "3:2" are the non-standard words. For ease of understanding, in the embodiment, the space are not used as the character. In other embodiments, each space can be used as a character.

The numeral recognition and/or the character recognition is performed on the text to be converted, if it is recognized that there is a numeral and/or a character in the text to be converted, the recognition result is that there is the non-standard word in the text to be converted; otherwise, the recognition result is that there is no non-standard word in the text to be converted.

Step 106, recognizing the non-standard word in the text to be converted by using an eXtreme Gradient Boosting model, in response to the text to be converted including the non-standard word.

The eXtreme Gradient Boosting (XGBoost) model, is used for recognizing the non-standard word in the text to be converted. It is necessary to train the XGBoost model in advance to obtain a trained XGBoost model, and then the trained XGBoost model is used to recognize the non-standard word in the converted text.

Step 108, obtaining a target converted text corresponding to the text to be converted, according to a recognition result outputted by the eXtreme Gradient Boosting model.

The XGBoost model will output the recognition result of the non-standard word, finally, the target converted text corresponding to the text to be converted can be obtained according to the recognition result outputted by the XGBoost model, thereby realizing the conversion of the text to be converted. In one embodiment, the target converted text corresponding to the text to be converted is outputted and saved in the memory. Further, the target converted text corresponding to the text to be converted can be synthesized into a corresponding speech and played.

The above method for text conversion, first obtains the text to be converted; then performs the non-standard word recognition on the text to be converted, and obtains the recognition result; if the recognition result is that the text to be converted includes the non-standard word, recognizes the non-standard word in the text to be converted by using the eXtreme Gradient Boosting model; and finally obtains the target converted text corresponding to the text to be converted, according to the recognition result outputted by the eXtreme Gradient Boosting model. Because the eXtreme Gradient Boosting model belongs to the machine learning model, and compared with the deep learning model, the model structure of the machine learning model is relatively simple, so compared with the deep learning model, using the eXtreme Gradient Boosting model to recognize the non-standard word in the text to be converted has a faster recognition speed. Moreover, compared with the machine learning model that uses a single classifier (for example, a single binary tree) to perform recognition, the eXtreme Gradient Boosting using superimposed classifiers to achieve recognition has a higher recognition accuracy.

Figure 2:
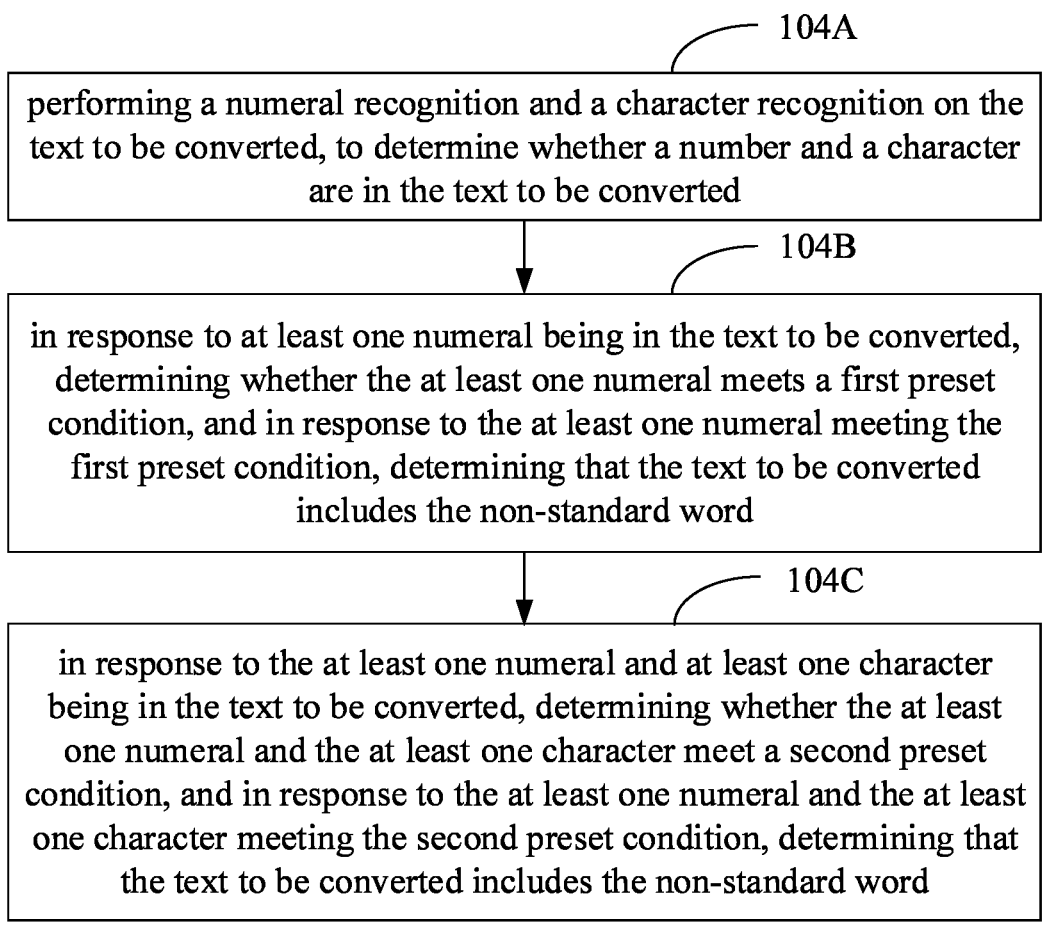
FIG. 2 is a schematic flow chart of one embodiment of step 104 in accordance with the present disclosure.

In one embodiment, a recognition method for recognizing continuous non-standard words in a specific form is provided. As shown in FIG. 2, the step 104 of performing the non-standard word recognition on the text to be converted, to determine whether the text to be converted includes the non-standard word, includes the following steps.

Step 104A, performing a numeral recognition and a character recognition on the text to be converted, to determine whether a number and a character are in the text to be converted.

Firstly, a single character segmentation is performed on the text to be converted, and multiple segmentation results are obtained, for example, the single character segmentation is performed on the text to be converted "the score is 3:2", and the multiple segmentation results are "the", "score", "is", "3", ":", and "2"; then the recognition is performed on the multiple segmentation results, to determine whether there are the numeral and the character in the text to be converted. As an example, the multiple segmentation results are compared with preset numerals and characters, to determine whether there are the numeral and the character in the text to be converted. For example, the segmentation result "3" is compared with the preset numerals and characters, and multiple similarities are obtained. The maximum similarity is extracted from the multiple similarities, and if the maximum similarity exceeds a preset value, it is determined that there is the numeral in the text to be converted, and the numeral corresponding to the maximum similarity is used as the recognition result of the segmentation result "3".

Step 104B, in response to at least one numeral being in the text to be converted, determining whether the at least one numeral meets a first preset condition, and in response to the at least one numeral meeting the first preset condition, determining that the text to be converted includes the non-standard word.

The first preset condition is a preset condition for recognizing the non-standard word.

As an example, the first preset condition is that there is at least one alphabetic character between consecutive numerals and/or numeral groups. The alphabetic character may include alphabetic characters of various countries or regions, such as a Chinese alphabetic character, a English alphabetic character, or a Japanese kana alphabetic character, etc. For example, the text to be converted is "my license plate number is JK12Z56", the consecutive numerals are "12" and "56", there is an alphabetic character "Z" between the consecutive numerals, and the recognition result is that the text to be converted includes the non-standard word. As another example, the text to be converted is "I live in room 605 unit 10 No. 15 Changjiang Road", the consecutive numeral groups are "605", "10", and "15", there are alphabetic characters "unit" and "No" between consecutive numeral groups, and the recognition result is that the text to be converted includes the non-standard word.

Step 104C, in response to the at least one numeral and at least one character being in the text to be converted, determining whether the at least one numeral and the at least one character meet a second preset condition, and in response to the at least one numeral and the at least one character meeting the second preset condition, determining that the text to be converted includes the non-standard word.

The second preset condition is a preset condition for recognizing the non-standard word.

As an example, the second preset condition is that there is at least one character between the consecutive numerals and/or numeral groups. For example, the text to be converted is "the score is 3:2", the consecutive numerals are "3" and "2", the character is ":", there is the character ":" between the consecutive numerals, then the recognition result is that the text to be converted includes the non-standard word. As another example, the text to be converted is "today is 2019/10/23", the consecutive numeral groups are "2019", "10" and "23", the character is "/", then the recognition result is that the text to be converted includes the non-standard word.

Figure 3:
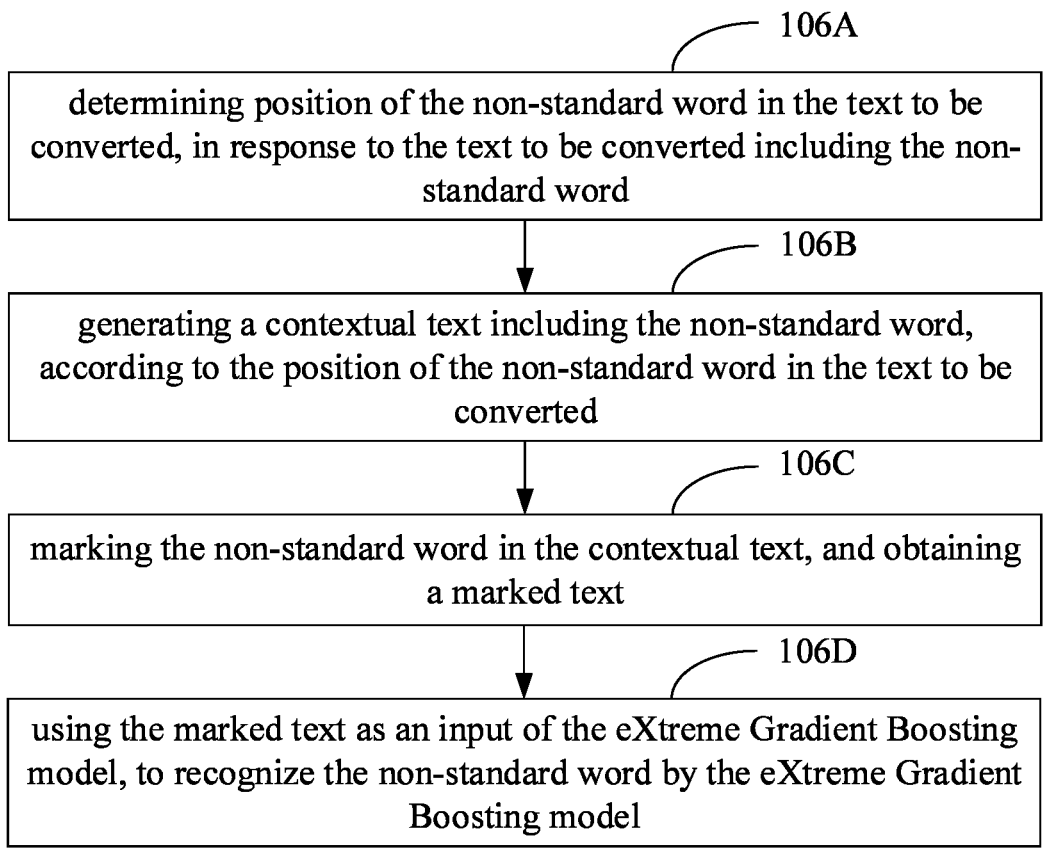
FIG. 3 is a schematic flow chart of one embodiment of step 106 in accordance with the present disclosure.
Figure 4:
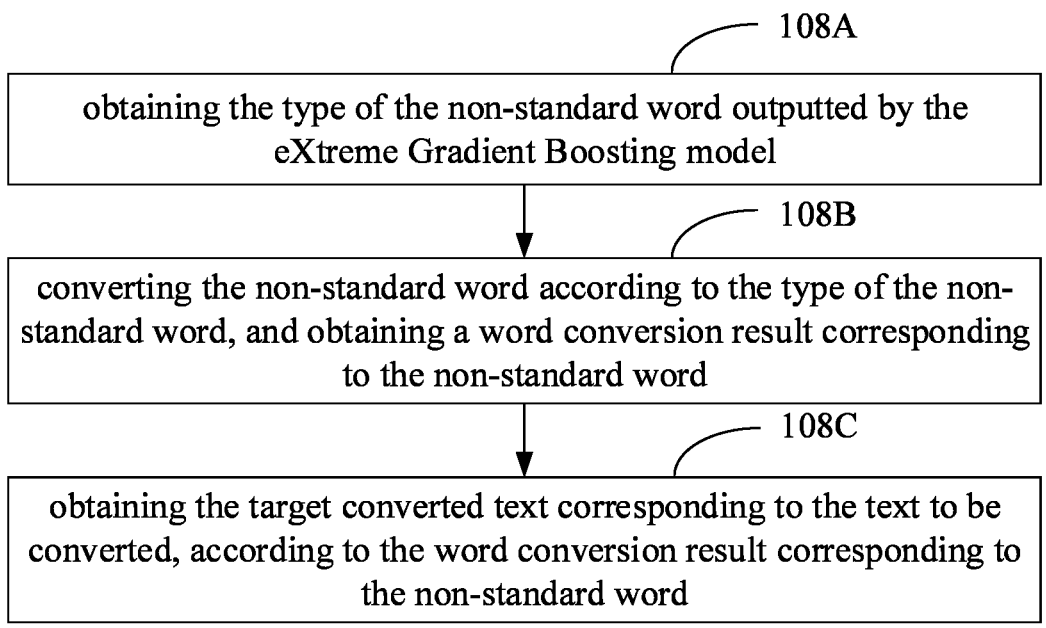
FIG. 4 is a schematic flow chart of one embodiment of step 108 in accordance with the present disclosure.

In one embodiment, the XGBoost model recognizes the non-standard word by recognizing context. As shown in FIG. 3, the step 106 of recognizing the non-standard word in the text to be converted by using the eXtreme Gradient Boosting model, in response to the text to be converted including the non-standard word, includes the following steps.

Step 106A, determining position of the non-standard word in the text to be converted, in response to the text to be converted including the non-standard word.

The position of the non-standard word in the text to be converted is determined according to the order in which the non-standard word appears in the text to be converted. For example, if the text to be converted is "today is 2019/10/19", the position of the non-standard word "2019" in the text to be converted is determined as: 3, the position of the non-standard word "10" in the text to be converted is determined as: 5, and the position of the non-standard word "19" in the text to be converted is determined as: 7.

Step 106B, generating a contextual text including the non-standard word, according to the position of the non-standard word in the text to be converted.

The position of the non-standard word in the text to be converted is used as a center of a window, a context is intercepted from the text to be concerted according to a preset window size, and the contextual text including the non-standard word is generated. For example, if the text to be converted is "he is a 10 year old boy and he lives in Building 14 of the Garden Apartment", the size of the window is 3, the contextual text of the non-standard word "10" is "a 10 year", and the contextual text of the non-standard word "14" is "Building 14 of".

Step 106C, marking the non-standard word in the contextual text, and obtaining a marked text.

For example, the non-standard word is marked by using <norm></norm>. Then, the result of marking the contextual text "a 10 year" is "a<norm>10</norm>year".

Step 106D, using the marked text as an input of the eXtreme Gradient Boosting model, to recognize the non-standard word by the eXtreme Gradient Boosting model.

In one embodiment, the recognition result outputted by the eXtreme Gradient Boosting model includes a type of the non-standard word. The step 108 of obtaining the target converted text corresponding to the text to be converted, according to the recognition result outputted by the eXtreme Gradient Boosting model, includes the following steps.

Step 108A, obtaining the type of the non-standard word outputted by the eXtreme Gradient Boosting model.

The XGBoost model uses the marked text as the input, and uses the type of the non-standard word as the output. The types of the non-standard word include a numeral string type and an integer type.

Step 108B, converting the non-standard word according to the type of the non-standard word, and obtaining a word conversion result corresponding to the non-standard word.

For example, if the text to be converted is "my phone number is 12345", the type of the non-standard words "12345" is the numeral string type, and the conversion result "one two three four five" is obtained according to the non-standard word "12345" and a method for converting the numeral string type. As another example, if the text to be converted is "he is a 10 year old boy", the type of the non-standard word "10" is the integer type, and the conversion result "ten" is obtained according to the non-standard word "10" and a method for converting the integer type.

Step 108C, obtaining the target converted text corresponding to the text to be converted, according to the word conversion result corresponding to the non-standard word.

The word conversion result corresponding to the non-standard word is filled in the text to be converted to replace the non-standard word, and the target converted text corresponding to the text to be converted can be obtained. For example, the conversion results of the text to be converted "my phone number is 12345 and this year is 2019", are "one two three four five" and "twenty nineteen", then the target converted text is "my phone number is one two three four five and this year is twenty nineteen".

In one embodiment, the XGBoost model is pre-trained, and the context including the non-standard word is used for training in the training process, so that the recognition is also performed according to the context during the subsequent recognition process, thereby improving the recognition rate effectively. Before the step 102 of obtaining the text to be converted, the method further includes the following steps.

Step 1, obtaining a training sample set, wherein the training sample set includes a plurality of training samples, and each training sample includes a training non-standard word.

The training sample set includes the plurality of training samples, each training sample includes at least one training non-standard word, and the plurality of training samples in the training sample set are used for training the XGBoost model.

Step 2, generating a marked text corresponding to the training non-standard word, according to the training non-standard word and a training sample corresponding to the training non-standard word.

Firstly, a training non-standard word in a training sample is found; then, a contextual text including the training non-standard word is obtained according to the training sample; and finally, the non-standard word is marked in the contextual text, and the marked text corresponding to the training non-standard word is obtained.

Step 3, using the marked text corresponding to the training non-standard word as an input of the eXtreme Gradient Boosting model, using a type corresponding to the training non-standard word as an output of the eXtreme Gradient Boosting model, and training the eXtreme Gradient Boosting model.

Finally, the XGBoost model is trained by using the marked text and the type corresponding to the training non-standard word, and the trained XGBoost model is obtained, so that the trained XGBoost model can be used to recognize the type of the non-standard word in later steps.

In one embodiment, the step 1 of obtaining the training sample set, includes the following steps.

Step 11, obtaining an original sample set, wherein the original sample set includes a plurality of training samples.

In the embodiment of the present disclosure, if the original sample set is directly used to train the XGBoost model, it may make the trained XGBoost model unable to recognize certain non-standard words well, resulting in a low recognition rate of the model. Therefore, the training samples in the original sample set are processed to obtain the training sample set, and the XGBoost model trained by using the training sample set has a higher recognition rate.

Step 12, selecting a target training sample meeting a third preset condition from the plurality of training samples in the original sample set.

The third preset condition is a preset condition.

For example, the plurality of training samples are classified according to the types of the non-standard words of the plurality of training samples in the original sample set; number of training samples for each category is obtained; if the number of training samples of a certain category is less than a first preset number, it is determined that the training samples of this category meet the third preset condition, and this category is determined as a target category. A second preset number of training samples (for example, select one) are selected from training samples under the target category, and the second preset number of selected training samples are used as the target training samples. If the training samples of a certain category are too few, the recognition result of the category may be affected.

As another example, strange and special training samples whose expression are different from the general expression are selected from the original sample set. These strange and special training samples may rarely appear in usual voice chat or WeChat typing chat. In order to enable the XGBoost model to recognize these non-standard words, it is necessary to copy the corresponding training samples multiple times. For example, the expression of each training sample in the original sample set is judged and analyzed. If the judgment result is that the expression of the training sample is not a preset expression, it is determined that the training sample meets the third preset condition, and the training sample is used as the target training sample.

Step 13, copying the target training sample multiple times, and obtaining a plurality of copied training samples.

For example, a target training sample is "today is 2019/1/1", the target training sample is copied three times, and three copied training samples are obtained.

Step 14, obtaining the training sample set by combining the plurality of copied training samples and the plurality of training samples in the original sample set.

Finally, because the target training samples have been copied multiple times, the number of the training samples in the final combined training sample set is increased compared with the original sample set.

Figure 5:
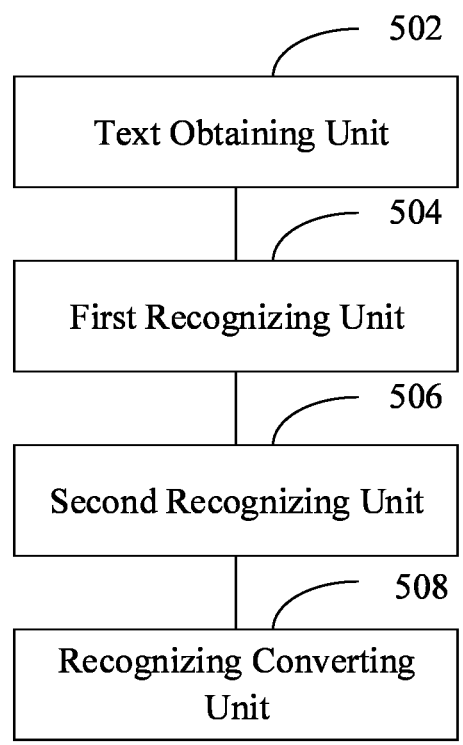
FIG. 5 is a schematic block diagram of one embodiment of a device for text conversion in accordance with the present disclosure.

As shown in FIG. 5, in one embodiment, a device 500 for text conversion is provided. The device 500 may be a computer device or be set up on the computer device. The device 500 includes:

a text obtaining unit 502, used for obtaining a text to be converted;

a first recognizing unit 504, used for performing a non-standard word recognition on the text to be converted, to determine whether the text to be converted includes a non-standard word;

a second recognizing unit 506, used for recognizing the non-standard word in the text to be converted by using an eXtreme Gradient Boosting model, in response to the text to be converted including the non-standard word; and a recognizing converting unit 508, used for obtaining a target converted text corresponding to the text to be converted, according to a recognition result outputted by the eXtreme Gradient Boosting model.

The above device for text conversion, first obtains the text to be converted; then performs the non-standard word recognition on the text to be converted, and obtains the recognition result; if the recognition result is that the text to be converted includes the non-standard word, recognizes the non-standard word in the text to be converted by using the eXtreme Gradient Boosting model; and finally obtains the target converted text corresponding to the text to be converted, according to the recognition result outputted by the eXtreme Gradient Boosting model. Because the eXtreme Gradient Boosting model belongs to the machine learning model, and compared with the deep learning model, the model structure of the machine learning model is relatively simple, so compared with the deep learning model, using the eXtreme Gradient Boosting model to recognize the non-standard word in the text to be converted has a faster recognition speed. Moreover, compared with the machine learning model that uses a single classifier (for example, a single binary tree) to perform recognition, the eXtreme Gradient Boosting using superimposed classifiers to achieve recognition has a higher recognition accuracy.

In one embodiment, the second recognizing unit 506, includes: a position determining unit, used for determining position of the non-standard word in the text to be converted, in response to the text to be converted including the non-standard word; a context unit, used for generating a contextual text including the non-standard word, according to the position of the non-standard word in the text to be converted; a text marking unit, used for marking the non-standard word in the contextual text, and obtaining a marked text; and a mark inputting unit, used for using the marked text as an input of the eXtreme Gradient Boosting model, to recognize the non-standard word by the eXtreme Gradient Boosting model.

In one embodiment, the recognition result includes a type of the non-standard word. The recognizing converting unit 508 includes: a type obtaining unit, used for obtaining the type of the non-standard word outputted by the eXtreme Gradient Boosting model; a non-standard word converting unit, used for converting the non-standard word according to the type of the non-standard word, and obtaining a word conversion result corresponding to the non-standard word; and a target converting unit, used for obtaining the target converted text corresponding to the text to be converted, according to the word conversion result corresponding to the non-standard word.

In one embodiment, the first recognizing unit 504 includes: a numeral character unit, used for performing a numeral recognition and a character recognition on the text to be converted, to determine whether a numeral and a character are in the text to be converted; a numeral unit, used for in response to at least one numeral being in the text to be converted, determining whether the at least one numeral meets a first preset condition, and in response to the at least one numeral meeting the first preset condition, determining that the text to be converted includes the non-standard word; and a character unit, used for in response to the at least one numeral and at least one character being in the text to be converted, determining whether the at least one numeral and the at least one character meet a second preset condition, and in response to the at least one numeral and the at least one character meeting the first preset condition, determining that the text to be converted includes the non-standard word.

In one embodiment, the device 500 further includes: a sample set obtaining unit, used for obtaining a training sample set, wherein the training sample set includes a plurality of training samples, and each training sample includes a training non-standard word; a sample marking unit, used for generating a marked text corresponding to the training non-standard word, according to the training non-standard word and a training sample corresponding to the training non-standard word; and a training unit, used for using the marked text corresponding to the training non-standard word as an input of the eXtreme Gradient Boosting model, using a type corresponding to the training non-standard word as an output of the eXtreme Gradient Boosting model, and training the eXtreme Gradient Boosting model.

In one embodiment, the sample set obtaining unit, includes: an original obtaining unit, used for obtaining an original sample set, wherein the original sample set includes a plurality of training samples; a target selecting unit, used for selecting a target training sample meeting a third preset condition from the plurality of training samples in the original sample set; a copying unit, used for copying the target training sample multiple times, and obtaining a plurality of copied training samples; and a combining unit, used for obtaining the training sample set by combining the plurality of copied training samples and the plurality of training samples in the original sample set.

Figure 6:
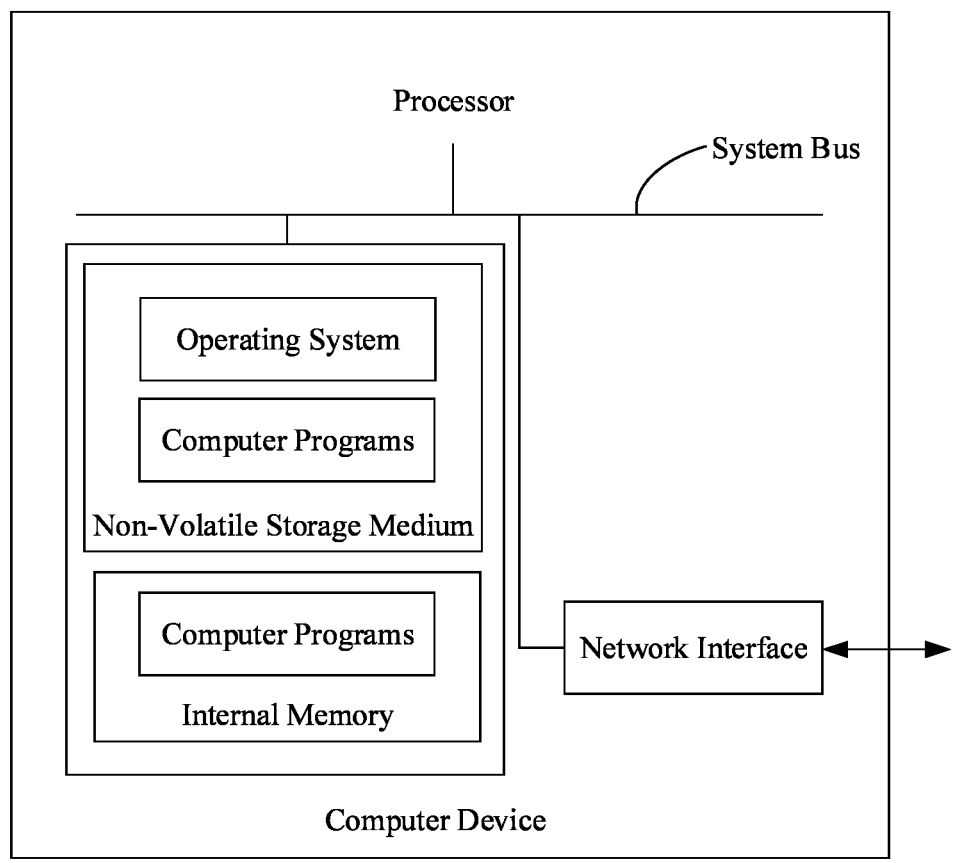
FIG. 6 is a schematic block diagram of one embodiment of a computer device in accordance with the present disclosure.

FIG. 6 is a schematic block diagram of a computer device according to an embodiment of the present invention. The computer device maybe a server, or a terminal. As shown in FIG. 6, the computer device includes a processor, a memory, and a network interface, and the processor, the memory, and the network interface are connected via the system bus. The network interface is used to communicate with external apparatuses via a network, for example, the computer device can obtain the text to be converted from the external apparatus or a database by the network interface, or the computer device can output the target converted text to the external apparatus by the network interface. The memory includes a non-volatile storage medium and an internal memory. The non-volatile storage medium of the computer device stores an operating system, and further stores computer programs, which when executed by the processor cause the processor to perform the above computer-implemented method for text conversion. The internal memory also stores the computer programs, which when executed by the processor cause the processor to perform the above computer-implemented method for text conversion. Those skilled in the art should also know that the structure shown in FIG. 6 is only a block diagram of part of the structure related to the solution of the present application, and it does not constitute a limitation on the computer device used to perform the solution of the present application. Specifically, the computer device may have more or fewer components than shown, may combine two or more components, or may have a different configuration or arrangement of the components.

In one embodiment, the method for text conversion provided by the present application can be realized in the form of computer programs, and the computer programs can be run on the computer device as shown in FIG. 6. The memory of the computer device can store various program templates that make up the above device for text conversion. For example, the text obtaining unit 502, the first recognizing unit 504, the second recognizing unit 506, and the recognizing converting unit 508.

A computer device includes a processor and a non-transitory storage. The non-transitory storage stores computer programs, and when the computer programs are executed by the processor, the following steps are performed:

obtaining a text to be converted;

performing a non-standard word recognition on the text to be converted, to determine whether the text to be converted includes a non-standard word;

recognizing the non-standard word in the text to be converted by using an eXtreme Gradient Boosting model, in response to the text to be converted including the non-standard word; and obtaining a target converted text corresponding to the text to be converted, according to a recognition result outputted by the eXtreme Gradient Boosting model.

In one embodiment, the step of recognizing the non-standard word in the text to be converted by using the eXtreme Gradient Boosting model, in response to the text to be converted including the non-standard word, includes: determining position of the non-standard word in the text to be converted, in response to the text to be converted including the non-standard word; generating a contextual text including the non-standard word, according to the position of the non-standard word in the text to be converted; marking the non-standard word in the contextual text, and obtaining a marked text; and using the marked text as an input of the eXtreme Gradient Boosting model, to recognize the non-standard word by the eXtreme Gradient Boosting model.

In one embodiment, the recognition result includes a type of the non-standard word. The step of obtaining the target converted text corresponding to the text to be converted, according to the recognition result outputted by the eXtreme Gradient Boosting model, includes: obtaining the type of the non-standard word outputted by the eXtreme Gradient Boosting model; converting the non-standard word according to the type of the non-standard word, and obtaining a word conversion result corresponding to the non-standard word; and obtaining the target converted text corresponding to the text to be converted, according to the word conversion result corresponding to the non-standard word.

In one embodiment, the step of performing the non-standard word recognition on the text to be converted, to determine whether the text to be converted includes the non-standard word, includes: performing a numeral recognition and a character recognition on the text to be converted, to determine whether a numeral and a character are in the text to be converted; in response to at least one numeral being in the text to be converted, determining whether the at least one numeral meets a first preset condition, and in response to the at least one numeral meeting the first preset condition, determining that the text to be converted includes the non-standard word; and in response to the at least one numeral and at least one character being in the text to be converted, determining whether the at least one numeral and the at least one character meet a second preset condition, and in response to the at least one numeral and the at least one character meeting the second preset condition, determining that the text to be converted includes the non-standard word.

In one embodiment, when the computer programs are executed by the processor, the following steps are further performed: obtaining a training sample set before obtaining the text to be converted, wherein the training sample set includes a plurality of training samples, and each training sample includes a training non-standard word; generating a marked text corresponding to the training non-standard word, according to the training non-standard word and a training sample corresponding to the training non-standard word; and using the marked text corresponding to the training non-standard word as an input of the eXtreme Gradient Boosting model, using a type corresponding to the training non-standard word as an output of the eXtreme Gradient Boosting model, and training the eXtreme Gradient Boosting model.

In one embodiment, the step of obtaining the training sample set, includes: obtaining an original sample set, wherein the original sample set includes a plurality of training samples; selecting a target training sample meeting a third preset condition from the plurality of training samples in the original sample set; copying the target training sample multiple times, and obtaining a plurality of copied training samples; and obtaining the training sample set by combining the plurality of copied training samples and the plurality of training samples in the original sample set.

A non-transitory computer readable storage medium storing computer programs. When the computer programs are executed by a processor, the following steps are performed:

obtaining a text to be converted;

performing a non-standard word recognition on the text to be converted, to determine whether the text to be converted includes a non-standard word;

recognizing the non-standard word in the text to be converted by using an eXtreme Gradient Boosting model, in response to the text to be converted including the non-standard word; and obtaining a target converted text corresponding to the text to be converted, according to a recognition result outputted by the eXtreme Gradient Boosting model.

In one embodiment, the step of recognizing the non-standard word in the text to be converted by using the eXtreme Gradient Boosting model, in response to the text to be converted including the non-standard word, includes: determining position of the non-standard word in the text to be converted, in response to the text to be converted including the non-standard word; generating a contextual text including the non-standard word, according to the position of the non-standard word in the text to be converted; marking the non-standard word in the contextual text, and obtaining a marked text; and using the marked text as an input of the eXtreme Gradient Boosting model, to recognize the non-standard word by the eXtreme Gradient Boosting model.

In one embodiment, the recognition result includes a type of the non-standard word. The step of obtaining the target converted text corresponding to the text to be converted, according to the recognition result outputted by the eXtreme Gradient Boosting model, includes: obtaining the type of the non-standard word outputted by the eXtreme Gradient Boosting model; converting the non-standard word according to the type of the non-standard word, and obtaining a word conversion result corresponding to the non-standard word; and obtaining the target converted text corresponding to the text to be converted, according to the word conversion result corresponding to the non-standard word.

In one embodiment, the step of performing the non-standard word recognition on the text to be converted, to determine whether the text to be converted includes the non-standard word, includes: performing a numeral recognition and a character recognition on the text to be converted, to determine whether a numeral and a character are in the text to be converted; in response to at least one numeral being in the text to be converted, determining whether the at least one numeral meets a first preset condition, and in response to the at least one numeral meeting the first preset condition, determining that the text to be converted includes the non-standard word; and in response to the at least one numeral and at least one character being in the text to be converted, determining whether the at least one numeral and the at least one character meet a second preset condition, and in response to the at least one numeral and the at least one character meeting the second preset condition, determining that the text to be converted includes the non-standard word.

In one embodiment, when the computer programs are executed by the processor, the following steps are further performed: obtaining a training sample set before obtaining the text to be converted, wherein the training sample set includes a plurality of training samples, and each training sample includes a training non-standard word; generating a marked text corresponding to the training non-standard word, according to the training non-standard word and a training sample corresponding to the training non-standard word; and using the marked text corresponding to the training non-standard word as an input of the eXtreme Gradient Boosting model, using a type corresponding to the training non-standard word as an output of the eXtreme Gradient Boosting model, and training the eXtreme Gradient Boosting model.

In one embodiment, the step of obtaining the training sample set, includes: obtaining an original sample set, wherein the original sample set includes a plurality of training samples; selecting a target training sample meeting a third preset condition from the plurality of training samples in the original sample set; copying the target training sample multiple times, and obtaining a plurality of copied training samples; and obtaining the training sample set by combining the plurality of copied training samples and the plurality of training samples in the original sample set.

It should be noted that, the above method for text conversion, device for text conversion, computer device, and non-transitory computer readable storage medium belong to a general inventive concept, the contents in the embodiments of the method for text conversion, device for text conversion, computer device, and non-transitory computer readable storage medium are mutually applicable.

It can be understood by those skilled in the art that the whole or parts of the process of the method in the above embodiment can be realized by computer programs instructing related hardware, the computer programs are stored in a non-transitory computer readable storage medium, when the programs are executed, it can include such as process of the embodiment of the above each method. Any reference to memory, storage, database or other media used in the embodiments provided in the present disclosure may include volatile and/or non-volatile memory. The non-volatile memory can include read only memory (ROM), programmable ROM (PROM), electrically programmable ROM (EPROM), electrically erasable ROM (EEPROM), or flash memory. The volatile memory can include random-access memory (RAM), or external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Sync Link DRAM (SLDRAM), Rambus direct RAM (RDRAM), direct Rambus dynamic RAM (DRDRAM), and Rambus dynamic RAM (RDRAM).

The technical features of the above embodiments can be employed in arbitrary combinations, for convenience of description, not all possible combinations of the various technical features in the above embodiments are described, however, as long as there is no contradiction in the combination of these technical features, it should be considered as the scope of the present specification.

The above embodiments only describe some embodiments of the present disclosure, the description of the above embodiments is more specific and detailed, but it cannot be understood as a limitation on the scope of the present disclosure. It should be noted, for those skilled in the art, some improvements and refinements can also be made without departing from the principle of the present disclosure, and these improvements and refinements should fall within the scope of the present disclosure. Therefore, the protection scope of the present disclosure shall be subject to the protection scope defined by the claims.

What is claimed is:

1. A computer-implemented method for text conversion, comprising:
   obtaining a text to be converted;
   performing a non-standard word recognition on the text to be converted, to determine whether the text to be converted comprises a non-standard word;
   recognizing the non-standard word in the text to be converted by using an eXtreme Gradient Boosting model, in response to the text to be converted comprising the non-standard word; and
   obtaining a target converted text corresponding to the text to be converted, according to a recognition result outputted by the eXtreme Gradient Boosting model.

2. The method as claimed in claim 1, wherein the step of recognizing the non-standard word in the text to be converted by using the eXtreme Gradient Boosting model, in response to the text to be converted comprising the non-standard word, comprises:
   determining position of the non-standard word in the text to be converted, in response to the text to be converted comprising the non-standard word;
   generating a contextual text comprising the non-standard word, according to the position of the non-standard word in the text to be converted;
   marking the non-standard word in the contextual text, and obtaining a marked text; and
   using the marked text as an input of the eXtreme Gradient Boosting model, to recognize the non-standard word by the eXtreme Gradient Boosting model.

3. The method as claimed in claim 1, wherein the recognition result comprises a type of the non-standard word, and the step of obtaining the target converted text corresponding to the text to be converted, according to the recognition result outputted by the eXtreme Gradient Boosting model, comprises:
   obtaining the type of the non-standard word outputted by the eXtreme Gradient Boosting model;
   converting the non-standard word according to the type of the non-standard word, and obtaining a word conversion result corresponding to the non-standard word; and
   obtaining the target converted text corresponding to the text to be converted, according to the word conversion result corresponding to the non-standard word.

4. The method as claimed in claim 1, wherein the step of performing the non-standard word recognition on the text to be converted, to determine whether the text to be converted comprises the non-standard word, comprises:
   performing a numeral recognition and a character recognition on the text to be converted, to determine whether a numeral and a character are in the text to be converted;
   in response to at least one numeral being in the text to be converted, determining whether the at least one numeral meets a first preset condition, and in response to the at least one numeral meeting the first preset condition, determining that the text to be converted comprises the non-standard word; and
   in response to the at least one numeral and at least one character being in the text to be converted, determining whether the at least one numeral and the at least one character meet a second preset condition, and in response to the at least one numeral and the at least one character meeting the second preset condition, determining that the text to be converted comprises the non-standard word.

5. The method as claimed in claim 1, wherein before the step of obtaining the text to be converted, the method further comprises:
   obtaining a training sample set, wherein the training sample set comprises a plurality of training samples, and each training sample comprises a training non-standard word;
   generating a marked text corresponding to the training non-standard word, according to the training non-standard word and a training sample corresponding to the training non-standard word; and
   using the marked text corresponding to the training non-standard word as an input of the eXtreme Gradient Boosting model, using a type corresponding to the training non-standard word as an output of the eXtreme Gradient Boosting model, and training the eXtreme Gradient Boosting model.

6. The method as claimed in claim 5, wherein the step of obtaining the training sample set, comprises:
   obtaining an original sample set, wherein the original sample set comprises the plurality of training samples;
   selecting a target training sample meeting a third preset condition from the plurality of training samples in the original sample set;
   copying the target training sample multiple times, and obtaining a plurality of copied training samples; and
   obtaining the training sample set by combining the plurality of copied training samples and the plurality of training samples in the original sample set.

7. The method as claimed in claim 2, wherein the step of generating the contextual text comprising the non-standard word, according to the position of the non-standard word in the text to be converted, comprises:
   using the position of the non-standard word in the text to be converted as a center of a window, and intercepting a context from the text to be converted according to a preset window size; and
   generating the contextual text comprising the non-standard word according to the context.

8. The method as claimed in claim 3, wherein the non-standard word comprises at least one of a numeral, a character and a numeral group, and the type of the non-standard word comprises a numeral string type and an integer type.

9. The method as claimed in claim 3, wherein the step of obtaining the target converted text corresponding to the text to be converted, according to the word conversion result corresponding to the non-standard word, comprises:
   filling the word conversion result corresponding to the non-standard word in the text to be converted to replace the non-standard word, and obtaining the target converted text corresponding to the text to be converted.

10. The method as claimed in claim 6, wherein the step of selecting the target training sample meeting the third preset condition from the plurality of training samples in the original sample set, comprises:
    classifying the plurality of training samples according to types of the non-standard words of the plurality of training samples in the original sample set; and
    determining a category whose number of training samples is less than a first preset number as a target category, and selecting a second preset number of training samples from training samples under the target category as the target training sample.

11. The method as claimed in claim 6, wherein the step of selecting the target training sample meeting the third preset condition from the plurality of training samples in the original sample set, comprises:
analyzing whether expression of each training sample in the original sample set is a preset expression; and
using a training sample whose expression is not the preset expression as the target training sample.

12. A computer device, comprising:
a processor and a non-transitory storage, the non-transitory storage storing computer programs, which when executed by the processor cause the processor to perform following steps:
obtaining a text to be converted;
performing a non-standard word recognition on the text to be converted, to determine whether the text to be converted comprises a non-standard word;
recognizing the non-standard word in the text to be converted by using an eXtreme Gradient Boosting model, in response to the text to be converted comprising the non-standard word; and
obtaining a target converted text corresponding to the text to be converted, according to a recognition result outputted by the eXtreme Gradient Boosting model.

13. The computer device as claimed in claim 12, wherein the step of recognizing the non-standard word in the text to be converted by using the eXtreme Gradient Boosting model, in response to the text to be converted comprising the non-standard word, comprises:
determining position of the non-standard word in the text to be converted, in response to the text to be converted comprising the non-standard word;
generating a contextual text comprising the non-standard word, according to the position of the non-standard word in the text to be converted;
marking the non-standard word in the contextual text, and obtaining a marked text; and
using the marked text as an input of the eXtreme Gradient Boosting model, to recognize the non-standard word by the eXtreme Gradient Boosting model.

14. The computer device as claimed in claim 12, wherein the recognition result comprises a type of the non-standard word, and the step of obtaining the target converted text corresponding to the text to be converted, according to the recognition result outputted by the eXtreme Gradient Boosting model, comprises:
obtaining the type of the non-standard word outputted by the eXtreme Gradient Boosting model;
converting the non-standard word according to the type of the non-standard word, and obtaining a word conversion result corresponding to the non-standard word; and
obtaining the target converted text corresponding to the text to be converted, according to the word conversion result corresponding to the non-standard word.

15. The computer device as claimed in claim 12, wherein the step of performing the non-standard word recognition on the text to be converted, to determine whether the text to be converted comprises the non-standard word, comprises:
performing a numeral recognition and a character recognition on the text to be converted, to determine whether a numeral and a character are in the text to be converted;
in response to at least one numeral being in the text to be converted, determining whether the at least one numeral meets a first preset condition, and in response to the at least one numeral meeting the first preset condition, determining that the text to be converted comprises the non-standard word; and
in response to the at least one numeral and at least one character being in the text to be converted, determining whether the at least one numeral and the at least one character meet a second preset condition, and in response to the at least one numeral and the at least one character meeting the second preset condition, determining that the text to be converted comprises the non-standard word.

16. The computer device as claimed in claim 12, wherein when the computer programs are executed by the processor, following steps are further performed:
obtaining a training sample set before obtaining the text to be converted, wherein the training sample set comprises a plurality of training samples, and each training sample comprises a training non-standard word;
generating a marked text corresponding to the training non-standard word, according to the training non-standard word and a training sample corresponding to the training non-standard word; and
using the marked text corresponding to the training non-standard word as an input of the eXtreme Gradient Boosting model, using a type corresponding to the training non-standard word as an output of the eXtreme Gradient Boosting model, and training the eXtreme Gradient Boosting model.

17. The computer device as claimed in claim 16, wherein the step of obtaining the training sample set, comprises:
obtaining an original sample set, wherein the original sample set comprises the plurality of training samples;
selecting a target training sample meeting a third preset condition from the plurality of training samples in the original sample set;
copying the target training sample multiple times, and obtaining a plurality of copied training samples; and
obtaining the training sample set by combining the plurality of copied training samples and the plurality of training samples in the original sample set.

18. The computer device as claimed in claim 13, wherein the step of generating the contextual text comprising the non-standard word, according to the position of the non-standard word in the text to be converted, comprises:
using the position of the non-standard word in the text to be converted as a center of a window, and intercepting a context from the text to be converted according to a preset window size; and
generating the contextual text comprising the non-standard word according to the context.

19. The computer device as claimed in claim 14, wherein the step of obtaining the target converted text corresponding to the text to be converted, according to the word conversion result corresponding to the non-standard word, comprises:
filling the word conversion result corresponding to the non-standard word in the text to be converted to replace the non-standard word, and obtaining the target converted text corresponding to the text to be converted.

20. A non-transitory computer readable storage medium storing computer programs, wherein when the computer programs are executed by a processor, following steps are performed:
obtaining a text to be converted;
performing a non-standard word recognition on the text to be converted, to determine whether the text to be converted comprises a non-standard word;
recognizing the non-standard word in the text to be converted by using an eXtreme Gradient Boosting model, in response to the text to be converted comprising the non-standard word; and obtaining a target converted text corresponding to the text to be converted, according to a recognition result outputted by the eXtreme Gradient Boosting model.

\* \* \* \* \*